US006471586B1

(12) United States Patent
Aiki et al.

(10) Patent No.: US 6,471,586 B1
(45) Date of Patent: Oct. 29, 2002

(54) GAME SYSTEM AND INFORMATION STORAGE MEDIUM

(75) Inventors: Shinichiro Aiki, Kawasaki; Satoru Ouchi, Yokohama, both of (JP)

(73) Assignee: Namco, Ltd., Tokyo (JP)

( * ) Notice: Subject to any disclaimer, the term of this patent is extended or adjusted under 35 U.S.C. 154(b) by 0 days.

(21) Appl. No.: 09/442,008

(22) Filed: Nov. 17, 1999

(51) Int. Cl.[7] .................. A63F 13/00; G06F 19/00
(52) U.S. Cl. .................. 463/6; 463/7; 463/36; 434/61
(58) Field of Search ............... 463/1, 6, 7, 23, 463/36, 39; 434/29, 61, 1; 472/59, 60, 95, 96, 97

(56) References Cited

U.S. PATENT DOCUMENTS

| | | | | |
|---|---|---|---|---|
| 4,925,189 A | * | 5/1990 | Braeunig | 273/148 B |
| 5,209,662 A | * | 5/1993 | Fujita et al. | 434/61 |
| 5,415,550 A | * | 5/1995 | Aoki et al. | 434/61 |
| 5,442,168 A | * | 8/1995 | Gurner et al. | 250/221 |
| 5,547,382 A | * | 8/1996 | Yamasaki et al. | 434/61 |
| 5,833,549 A | * | 11/1998 | Zur et al. | 473/199 |
| 5,848,939 A | * | 12/1998 | Smith | 472/60 |
| 5,860,861 A | * | 1/1999 | Lipps et al. | 463/36 |
| 5,913,727 A | * | 6/1999 | Ahdoot | 463/39 |
| 5,951,404 A | * | 9/1999 | Oishi et al. | 472/60 |
| 6,030,223 A | * | 2/2000 | Sugimori | 434/61 |
| 6,106,397 A | * | 8/2000 | Phillips | 463/36 |
| 6,120,375 A | * | 9/2000 | Takahashi | 463/7 |
| 6,210,167 B1 | * | 4/2001 | Nishiyama | 434/247 |
| 6,225,977 B1 | * | 5/2001 | Li | 345/156 |

* cited by examiner

Primary Examiner—Michael O'Neill
Assistant Examiner—Julie Brocketti
(74) Attorney, Agent, or Firm—Morrison & Foerster, LLP

(57) ABSTRACT

A game system for providing players with a higher sense of presence, a virtual reality environment and real-life simulations. A forward lean position of a player is detected by a forward lean position detector to carry out game computation to control a moving object on a screen according to operation information supplied by the player, including information indicative of the detected forward lean position. A force to rotate the moving object, a speed of the moving object and a motion of a cartoon character on the screen are controlled according to the forward lean position information. An information storage medium applicable to such a game system is also provided.

30 Claims, 13 Drawing Sheets

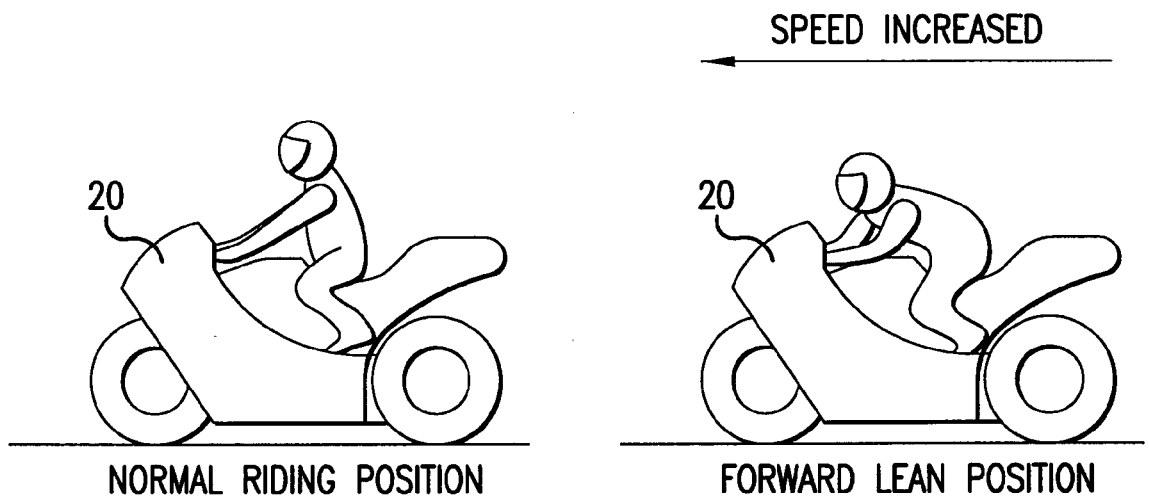
FIG.8A NORMAL RIDING POSITION
FIG.8B FORWARD LEAN POSITION (SPEED INCREASED)
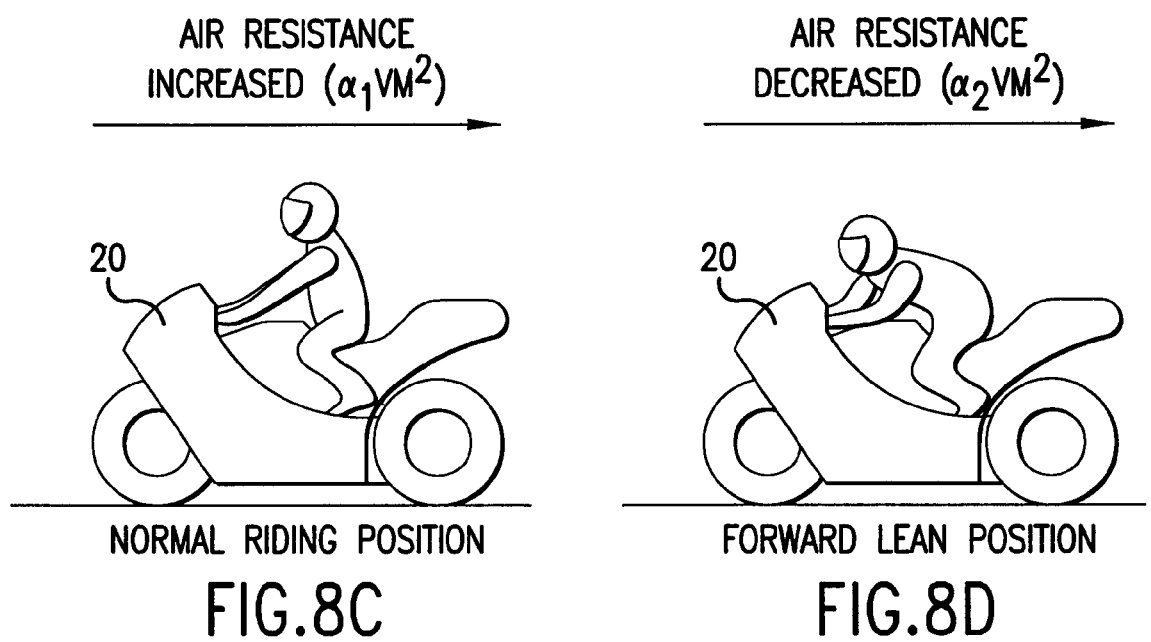
FIG.8C NORMAL RIDING POSITION (AIR RESISTANCE INCREASED ($\alpha_1 VM^2$))
FIG.8D FORWARD LEAN POSITION (AIR RESISTANCE DECREASED ($\alpha_2 VM^2$))

NORMAL RIDING POSITION

FORWARD LEAN POSITION

NORMAL RIDING POSITION

FORWARD LEAN POSITION

GAME SYSTEM AND INFORMATION STORAGE MEDIUM

FIELD OF THE INVENTION

The invention relates to a game system and a storage medium for storing information about the game.

BACKGROUND OF THE INVENTION

Various types of game systems have been developed and put on the market that include racing simulators in which a player "drives" a moving object in a game field and enjoys competition with other player(s) or with other computer-generated moving objects. Such systems which provide a so-called virtual reality environment have generated much popularity. For example, in one game system, a player rides a motorcycle racing against other motorcycles driven by competitors or controlled by a computer. The game system allows the player to control his or her motorcycle by leaning it, rolling it over and over, or accelerating it with a twist grip throttle at the ends of a steering handle. These controls, however, are not enough to provide the player the sensation of reality of operation. Thus, some challenges remain in providing a higher sense of presence, of "being," in a virtual reality environment.

In addition, the moving object such as the motorcycle, in the game field is limited to a speed such that the motorcycle will never exceed a predetermined limit. Hence, during the final moments of game play, a player racing at a maximum speed that is neck-and-neck with a competitor will be unable to increase their speed to achieve victory at the goal line. In such a case, either the outcome of the race will be judged as a dead heat, or the competitor may edge out the race. Eventually, the race may become boring and lose its thrill.

Furthermore, conventional game systems of the type described cannot cause the motorcycle to perform a pop wheelie. The player does not have the ability to simulate, with reality, the weight distribution between the front and rear wheels of the motorcycle when it does a wheelie.

SUMMARY OF THE INVENTION

The invention provides a game system which provides a higher sense of presence, of "being," in a virtual reality environment and provides game simulations with higher reality. Another feature of the invention is to provide an information storage medium applicable to such a game system.

A game system in accordance with an embodiment of the invention includes a unit or means for detecting a forward lean position of the player, a unit or means for carrying out game computing according to operation information supplied by the player, the operation information including information indicative of the forward lean position of the player, and a unit or means for carrying out processing to create at least one of a game image and a game sound according to the result of the game computing.

According to the invention, the forward lean position of the player is detected and the game computing is carried out according to operation information supplied by the player. This operation information may include information indicative of the forward lean position of the player to create the game image and/or game sound. As a result, the invention can provide game computing depending on the position or attitude of the player (whether or not the player is in the forward lean position) or on the degree of the forward lean position of the player. This gives the player a sense of presence in the virtual world with high reality which has not been achieved with conventional game systems.

In addition, according to the invention, a moving object traveling in an object space may be controlled according to the forward lean position information in response to the operation by the player. This allows control of the moving object depending on the position of the player, achieving simulations with high reality.

Furthermore, according to the invention, at least one of a force to rotate the moving object, a speed of the moving object and a motion of the moving object may be controlled according to the forward lean position information. Therefore, it is possible to reduce the force to rotate the moving object when the player is in the forward lean position. Alternatively, motion of the moving object (such as a cartoon character) may be selected as the motion for the forward lean position of the player.

In addition, according to the invention, the speed of the moving object may be controlled by changing information indicative of an air resistance coefficient of the moving object according to the forward lean position information. Therefore, unnatural or unlimited increase of the speed of the moving object can be avoided effectively.

Furthermore, according to the invention, the force to accelerate a moving object may be controlled according to the force lean position information obtained at the beginning of movement of a moving object. A force component contributing to the rotation of a moving object may be separated from a force component contributing to the translation motion of the same moving object. The forward lean position of the player may be detected by detecting the distance between the player and a detector disposed in front of the player.

According to another aspect of the invention, there is provided a game system in which a player can enjoy a game play, the game system comprising a unit or means for detecting a distance from the player, a unit or means for carrying out game computing according to operation information supplied by the player, the operation information including information indicative of the distance from the player and a unit or means for carrying out processing to create at least one of a game image and a game sound according to the result of the game computing.

In addition, the distance between the detector and the player may be detected and the game computing may be carried out according to operation information supplied by the player including information indicative of the distance to create the game image and/or game sound. As a result, the invention can provide game computing depending on the distance of the player from the detector. This gives the player a sense of presence in the virtual world with high reality that has not been achieved with conventional game systems.

BRIEF DESCRIPTION OF THE DRAWINGS

These and other objects, features, aspects and advantages of the invention will become more apparent from the following detailed description of the invention when taken in conjunction with the accompanying drawings in which:

FIGS. 8(A) through 8(D) are representations describing a technique to control a speed of a moving object according to information indicative of the forward lean position;

DETAILED DESCRIPTION OF THE INVENTION

A preferred embodiment of the invention is described in detail below with reference to the drawings. The detailed description which follows is represented largely in terms of an arcade motorcycle game. However, the invention is not limited to this specific example and may be practiced in various other ways.

Figure 1:
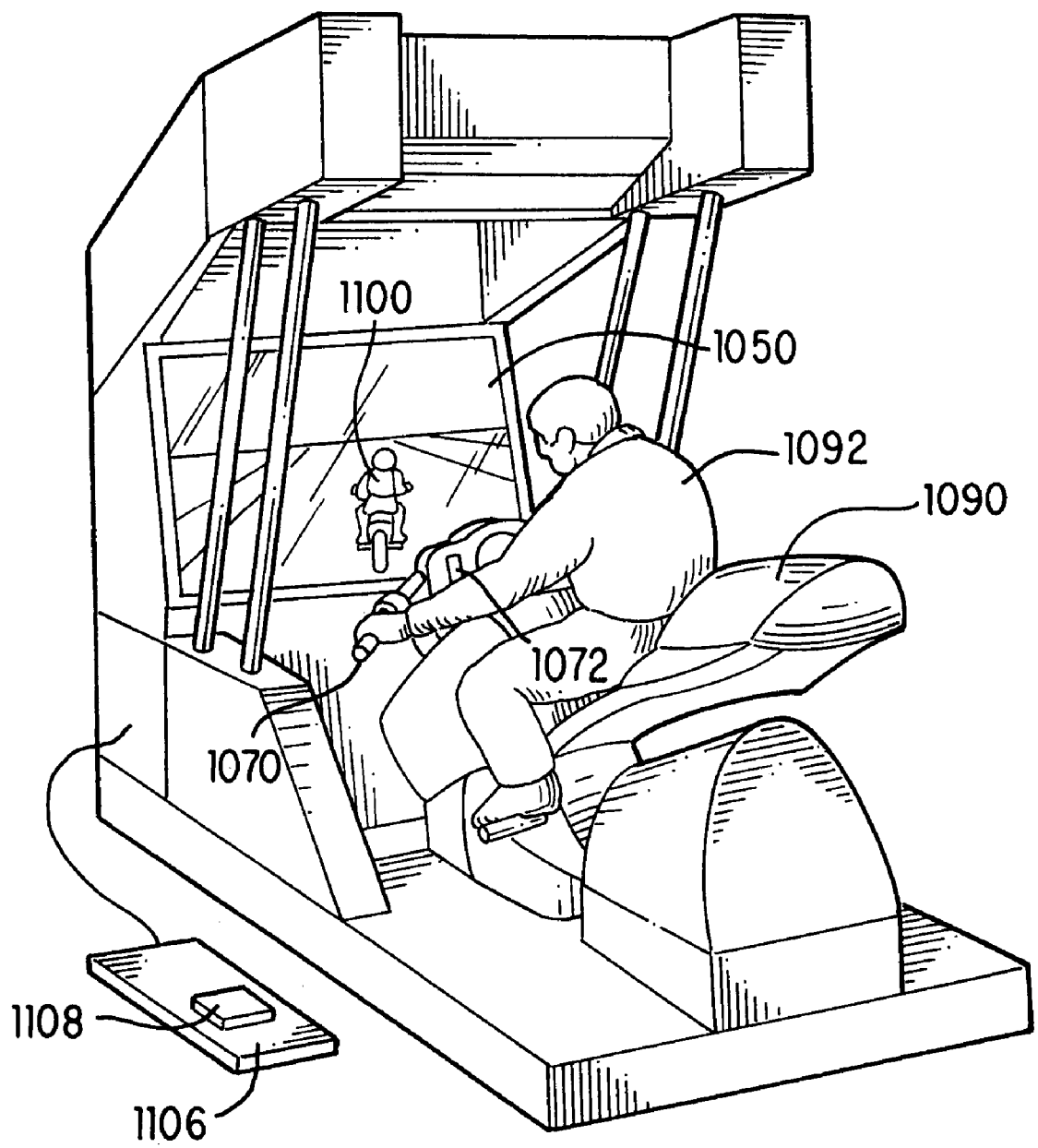
FIG. 1 is a view illustrating an embodiment of the invention which is implemented as an arcade game system.
Figure 2:
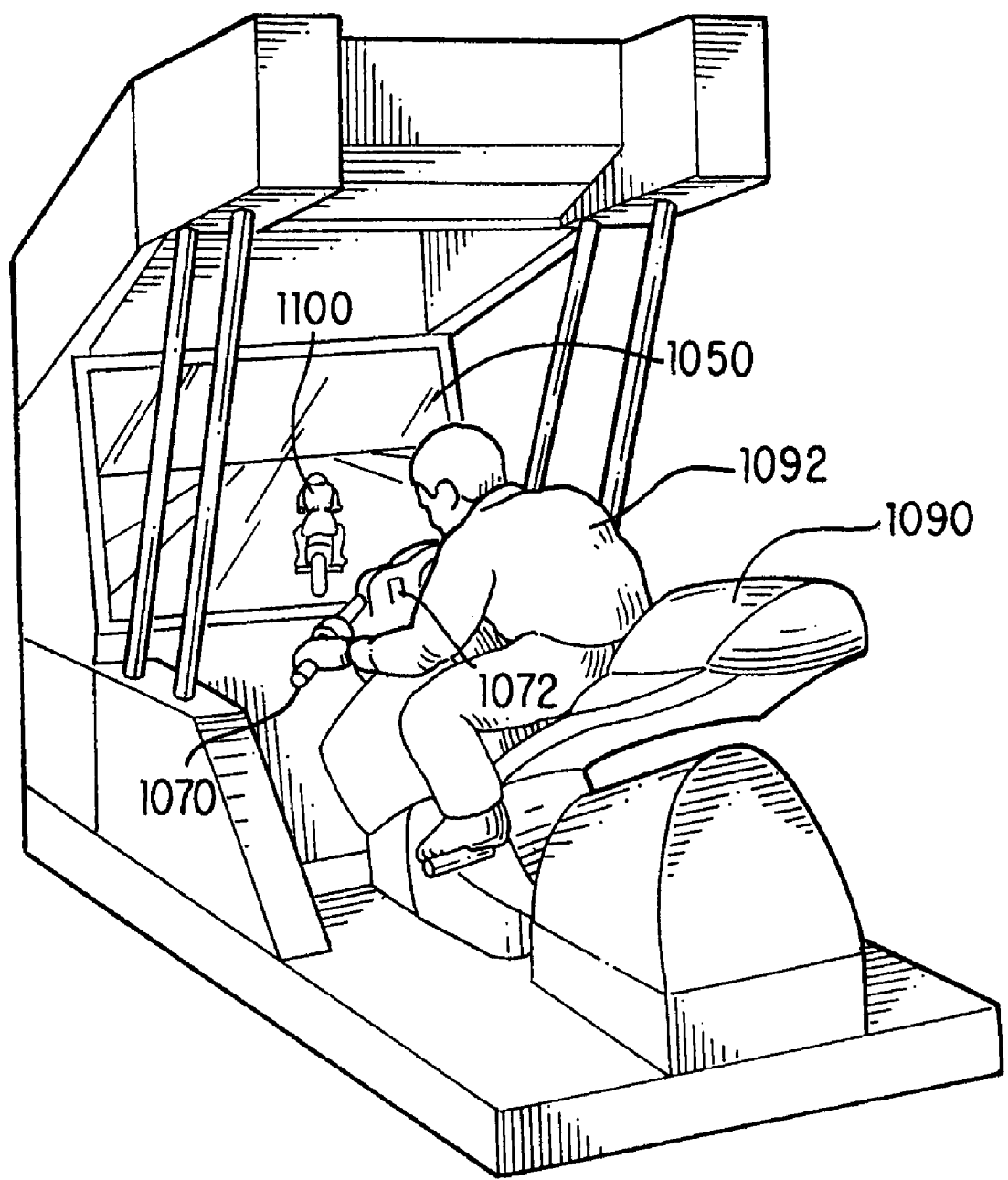
FIG. 2 is a view similar to FIG. 1 illustrating a player in a forward lean position.

FIG. 1 is a view illustrating an embodiment of the invention which is implemented as an arcade game system. Player 1092 rides on a motorcycle body 1090 imitating an actual motorcycle to enjoy game play. The player 1092 controls a steering handle 1070 and a twist grip throttle on steering handle 1070 or rolls motorcycle body 1090 over and over, seeing scenery graphics flying by on a screen 1050 in front of player 1092. In response to the player's control of the twist grip throttle or a front brake, a moving object (motorcycle) 1100 displayed on screen 1050 accelerates or decelerates. Moving object 1100 turns right/left or rolls over when player 1092 steers steering handle 1070 or rolls body 1090. Steering handle 1070 has a forward lean position detector (the terms detector and sensor are used interchangeably throughout this specification) 1072 for detecting a front lean position (a bent forward position) of player 1092. Forward lean position detector 1072 may be, for example, a distance sensor, a proximity sensor, or a motion sensor for sensing an infrared ray reflected from player 1092. More specifically, when player 1092 is in a forward lean position as shown in FIG. 2 and the gap between forward lean position detector 1072 and player 1092 becomes equal to or smaller than a predetermined value, then a transistor built in forward lean position detector 1072 is charged, causing a flow of electric current. Therefore, the detection of this current may be used to determine whether the gap between forward lean position detector 1072 (steering handle 1070) and player 1092 is equal to or smaller than a predetermined value, that is, whether player 1092 is in a forward lean or not.

Figure 3:
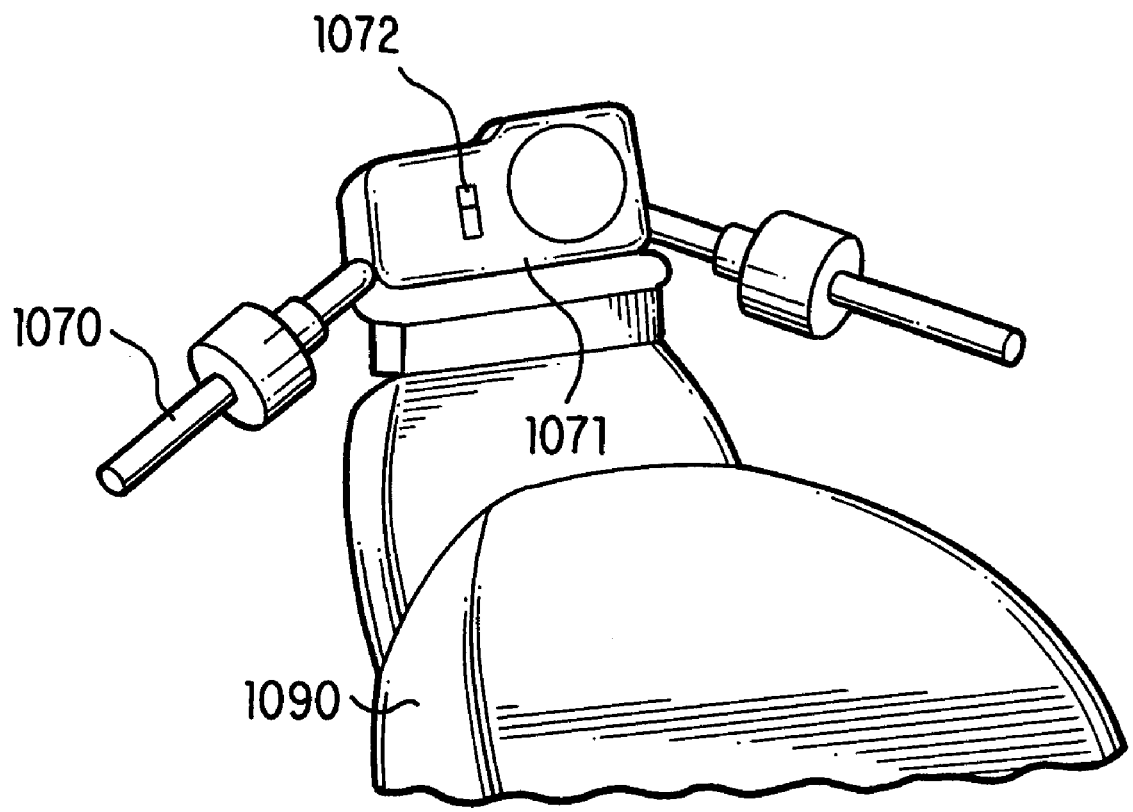
FIG. 3 is a view illustrating a forward lean position detector disposed at the head of a motorcycle in a game system.

As shown in FIG. 3, forward lean position detector 1072 is preferably disposed on an instrument panel 1071 at the center of steering handle 1070. This arrangement results in a generally fixed relative position between forward lean position detector 1072 and player 1092 regardless of whether player 1092 is rolling body 1090 or not. For example, when player 1092 leans body 1090 to the right, instrument panel 1071 on which forward lean position detector 1072 is disposed also leans to the right. Thus, the position of player 1092 does not change significantly relative to forward lean position detector 1072.

Figure 4A:
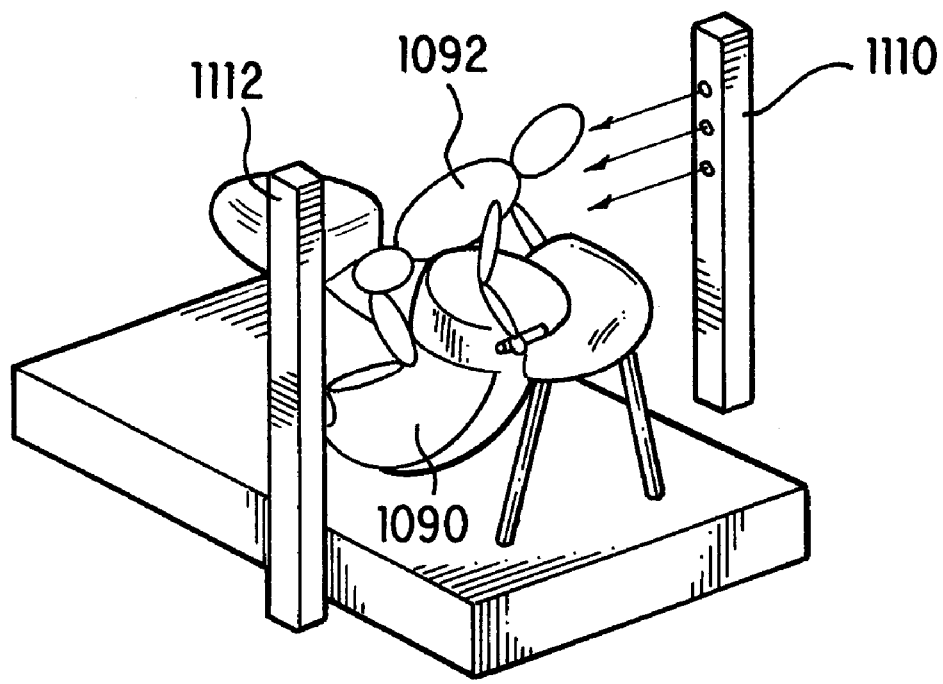
FIGS. 4(A) and 4(B) are schematic views illustrating how to determine whether a player is in a forward lean position.
Figure 4B:
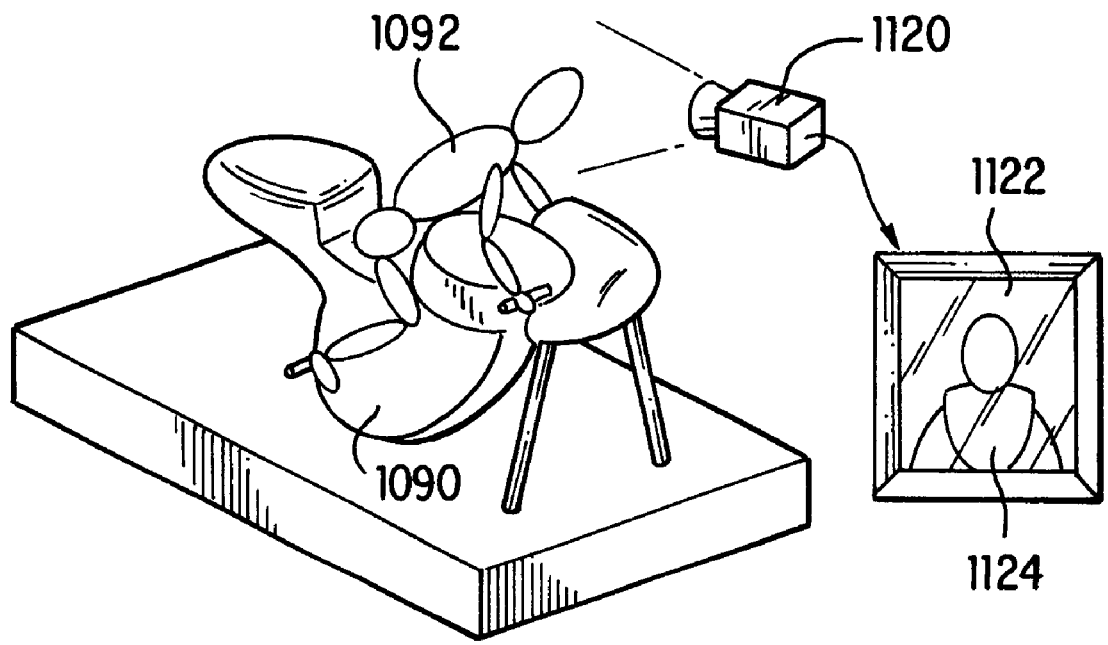

As shown in FIG. 4(A), an alternative design of forward lean position detector 1072 includes a laser transmitting unit 1110 and a laser receiving unit 1112 provided at the position corresponding to the sides of player 1092. The combination of laser transmitting unit 1110 and laser receiving unit 1112 serves as an area sensor. The laser beam is emitted from laser transmitting unit 1110 and received by laser receiving unit 1112 in the absence of an obstacle in the path of the laser beam. Therefore, the presence of the head of player 1092 in the optical path indicates that player 1092 is in a forward lean position. Alternatively, a CCD camera 1120 (image pick-up unit) may be used as shown in FIG. 4(B). CCD camera 1120 is disposed in front of player 1092 and picks up an image 1122 of player 1092. Image 1122 is then subjected to image processing such as chroma-key processing to extract only a picture 1124 of player 1092 to determine that the player is in a forward lean position.

Figure 5:
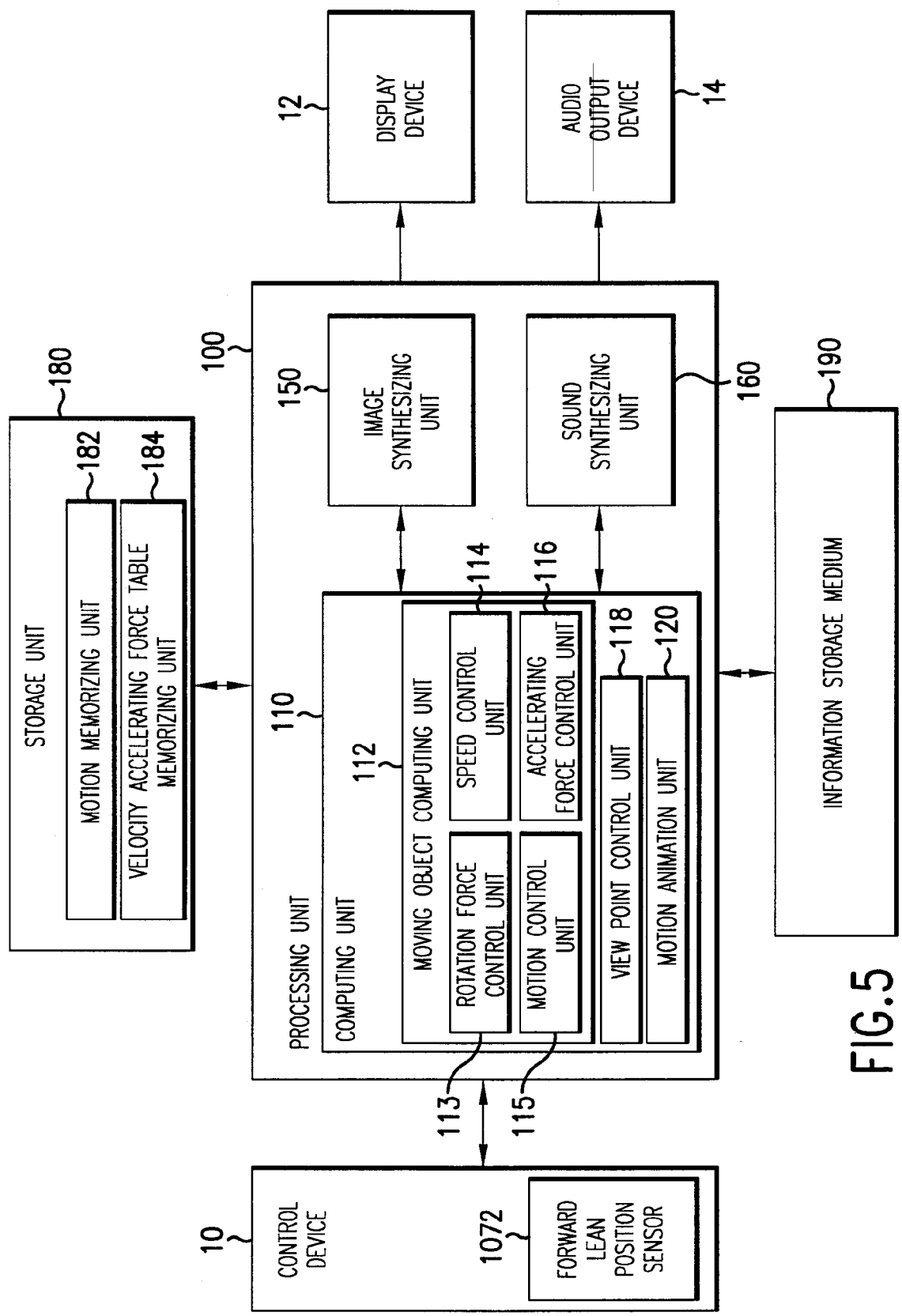
FIG. 5 is a functional block diagram of an embodiment of the invention.

FIG. 5 is a functional block diagram according to an embodiment of the invention. A control device 10 allows a player to enter control information to the game system. Control device 10 may be a hardware component as shown in FIG. 1, that is, steering handle 1070, the twist grip throttle and a brake on steering handle 1070, forward lean position detector 1072 and body 1090. Control device 10 is connected to a processing unit 100. Processing unit 100 performs various computations and operations, for example, to control the entire system or to issue a command to other units in the system. Processing unit 100 may be implemented in a hardware component such as a central processing unit (CPU) of a reduced instruction set computer (RISC) type or a complex instruction set computer (CISC) type microprocessor, a digital signal processor (DSP), or an application specific integrated circuit (ASIC)/gate array. Processing unit 100 may also be implemented in an appropriate program (game program) or programs.

A storage unit 180 is connected to processing unit 100 and serves as, for example, a work area for processing unit 100. Storage unit 180 includes a motion memorizing unit 182 and a velocity-accelerating force table memorizing unit 184 and may be achieved by a random-access memory (RAM). Processing unit 100 is also associated with an information storage medium (computer readable storage medium) 190 for storing a program or a data. The function of information storage medium 190 may be provided by using an optical disk (such as a CD-ROM or a DVD), a magneto-optical disk (MO), a magnetic disk, a hard disk, a magnetic tape, a semiconductor memory (ROM) or a portable information storage device such as a memory card, a personal digital assistant (PDA), a personal game device or a game cartridge. Processing unit 100 carries out various computations and operations by using the program(s) and data stored in information storage medium 190. A part or all of the information stored in information storage medium 190 is transferred to storage unit 180 when power is applied to the system.

Processing unit 100 includes a game computing unit 110, an image synthesizing unit 150 and a sound synthesizing unit 160. Game computing unit 110 carries out operations according to the information supplied from control device 10 or based on the program stored in storage unit 180 and/or information storage medium 190. Such operations include, but not limited to, acceptance of a coin dropped into the system, game mode setting, game proceedings, menu/command settings, processing to determine a position and/or orientation of a moving object (motorcycle, person/cartoon character, robot, automobile, tank, aircraft, spaceship, ship, boat, ski board, surfboard, ball, bullet, etc.), processing to determine a view point and/or viewing direction, animating a moving object, mapping of an object in an object region, hit checking, computation of a game outcome (ranking), processing to allow two or more players to play together in a single game field, or game over processing. Game computing unit 110 is connected to an image synthesizing unit 150 which produces a game image (scenery graphic). The game image is displayed on a display device 12 connected to processing unit 100. A sound synthesizing unit 160 is also provided for producing sounds and acoustic effects suitable to the result of the game computing carried out by game computing unit 110. The sounds produced by sound synthesizing unit 160 are emitted through an audio output device 14.

Game computing unit 110 includes a moving object computing unit 112, a view point control unit 118 and a motion animation unit 120. Moving object computing unit 112 is for controlling a moving object. For example, moving object computing unit 112 moves a moving object in a predetermined object region according to the information supplied from control device 10 or based on the program stored in storage unit 180 and/or information storage medium 190. In other words, moving object computing unit 112 carries out an operation to move the moving object in the object region according to the operation information provided by the player (collectively including one or more players) and instructions supplied by a computer such as a predetermined motion control algorithm. More specifically, moving object computing unit 112 calculates the position and the orientation of the moving object for every one frame (1/60 seconds). For example, let a position, a velocity and an acceleration of the moving object in a (k−1)-th frame be $PM_{k-1}$, $VM_{k-1}$ and $AM_{k-1}$, respectively, and one frame period be $\Delta t$, then a position $PM_k$ and a velocity $VM_k$ of the moving object in a k-th frame may be given as the following equations (1) and (2):

$$PM_k = PM_{k-1} + VM_{k-1} \times \Delta t \quad (1)$$

$$VM_k = VM_{k-1} + AM_{k-1} \times \Delta t \quad (2).$$

View point control unit 118 carries out operations to obtain a view point and a viewing direction. More specifically, view point control unit 118 may change the view point and/or the viewing direction to track the position or the direction of the moving object operated by the player. In this event, it is preferable that the tracking of the view point or the viewing direction be made with some inertia. Image synthesizing unit 150 synthesizes an image viewed from the view point controlled by view point control unit 118. Motion animation unit 120 carries out an operation to animate the motion of the moving object (such as a motorcycle or a rider thereon) according to a motion data stored in motion memorizing unit 182 in storage unit 180. It is preferable that motion animation unit 120 uses motion interpolation or inverse kinematics to animate the motion of the moving object.

As apparent from FIG. 5, moving object computing unit 112 includes a rotation force control unit 113, a speed control unit 114, a motion control unit 115 and an accelerating force control unit 116. Rotation force control unit 113 controls the force to rotate the moving object according to information indicative of the forward lean position of the player which is obtained by means of the forward lean position detector. More specifically, rotation force control unit 1 13 controls a rotation force to change a pitch angle of the moving object. In an embodiment of the riding game, the drive torque to cause a wheelie is an example of the rotation force controlled by rotation force control unit 113. Rotation force control unit 113 reduces the rotation force (to, for example, a default value) when the player is in the forward lean position while increases it when the player is in the normal riding position.

Speed control unit 114 controls the speed of the moving object according to the information indicative of the forward lean position of the player (hereinafter referred to as "forward lean position information"). More specifically, speed control unit 114 changes an air resistance coefficient for the moving object according to the forward lean position information. The term "information indicative of the air resistance coefficient" used herein means in a broad sense information indicative of an air resistance coefficient (hereinafter referred to as "air resistance information"). The air resistance information includes a rate of current air resistance, a default air resistance and other information equivalent to the air resistance information. Speed control unit 114 decreases the air resistance coefficient when the player is in the forward lean position and increases (or sets to a default value) the air resistance coefficient when the player is in the normal riding position.

Motion control unit 115 controls the motion of the moving object (such as a motorcycle or a rider thereon) according to the forward lean position information. More specifically, motion control unit 115 selects motion data for the moving object according to the forward lean position information. For example, motion control unit 115 reads motion data for the forward lean position out of motion memorizing unit 182 when the player is in the forward lean position. Motion control unit 115 reads motion data for the normal riding position out of motion memorizing unit 182 when the player is in the normal riding position. Motion animation unit 120 animates the motion of the moving object according to the motion data read out of motion memorizing unit 182.

Accelerating force control unit 116 controls an accelerating force for the moving object. More specifically, accelerating force control unit 116 increases an accelerating force applied to the moving object when the player is in the forward lean position at the beginning of the driving. This allows a fast start at the start of a race.

The game system of this embodiment can be configured in a single player mode to just race by yourself for practice or race against yourself. The game system can also be configured in a multiplayer mode, which allows two or more players to team up or compete against each other via a transmission line, a communication line (including the Internet), a modem or a local area network. The scenery graphics, images, sounds and effects may be generated in a single game system or in two or more game systems connected with each other on a network.

A feature of this embodiment lies in game computing based on the operation information including information indicative of the front lean position (bent forward position). More specifically, the feature lies in the control of the moving object operated by the player according to the forward lean position information.

Figure 6A:
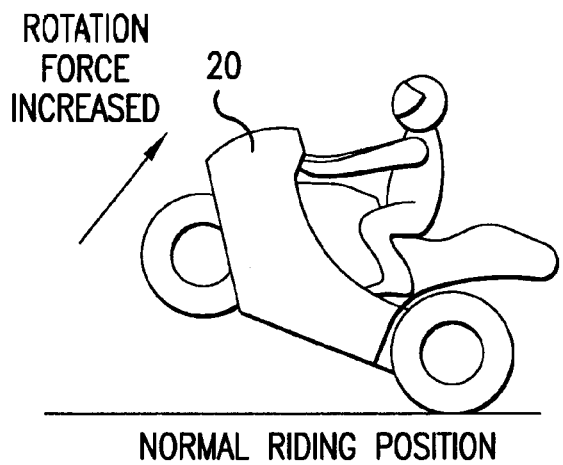
FIGS. 6(A) through 6(D) are representations describing a technique to control a force to rotate a moving object according to information indicative of the forward lean position.

As shown in FIG. 6(A), the rotation force (drive torque to cause a wheelie) acting on a moving object 20 is increased when the player is in the normal riding position. On the other hand, the rotation force is decreased when the player is in the forward lean position. This allows the player to restrict the wheelie (pop up) of moving object 20 by shifting the weight of his or her body to achieve the forward lean position. Therefore, moving object (motorcycle) 20 is less likely to pop up when the player shifts his or her body weight to the front wheel of moving object 20. The player also can lift the front wheel of moving object 20 into the air, i.e., do the front wheel wheelie by means of shifting his or her weight back to the normal riding position. This provides the player a more realistic sensation and a more exciting game operation.

Figure 6B:
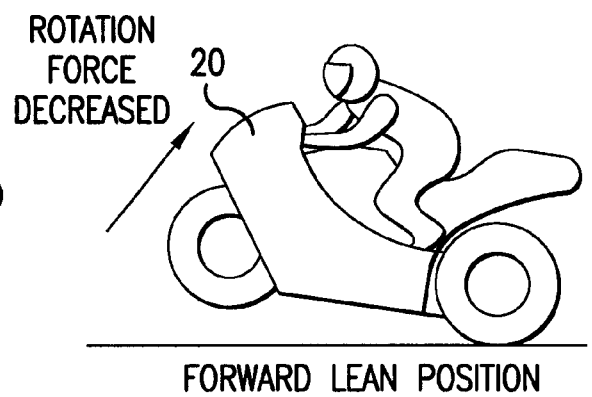
Figure 6C:
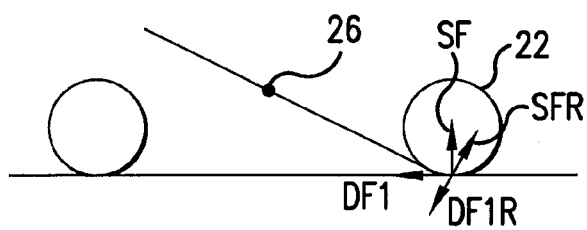

Next, a wheelie simulation of the moving object is described in detail with reference to FIG. 6(C). In FIG. 6(C), a force component to accelerate the moving object (accelerating force, driving force) DF1 is generated at a rear wheel 22 of the moving object. The accelerating force component DF1 acts in a direction parallel to the ground surface. The accelerating force component DF1 produces a force component DF1R to rotate the moving object in, for example, a clockwise direction about a center of gravity 26 of the moving object. In addition, rear wheel 22 of the moving object has a suspension reaction force component SF because of the compression of the suspension. The suspension reaction force component SF is a force acting on rear wheel 22 in the direction perpendicular to the ground surface. The suspension reaction force component SF produces a force component SFR to rotate the moving object in, for example, a counter-clockwise direction about a center of gravity 26 of the moving object.

When force component DF1R is smaller than the force component SFR, there is no wheelie of the moving object, and when force component DF1R is larger than the force component SFR, this causes a wheelie of the moving object and increases a pitch angle gradually. As the moving object accelerates, the pitch angle increases. Then the front wheel of the moving object is lifted up, increasing the stroke of the suspension. As a result, the force component SFR gradually increases and becomes larger than force component DF1R, decreasing the pitch angle of the moving object and finally forcing the front wheel to contact the ground.

Figure 6D:
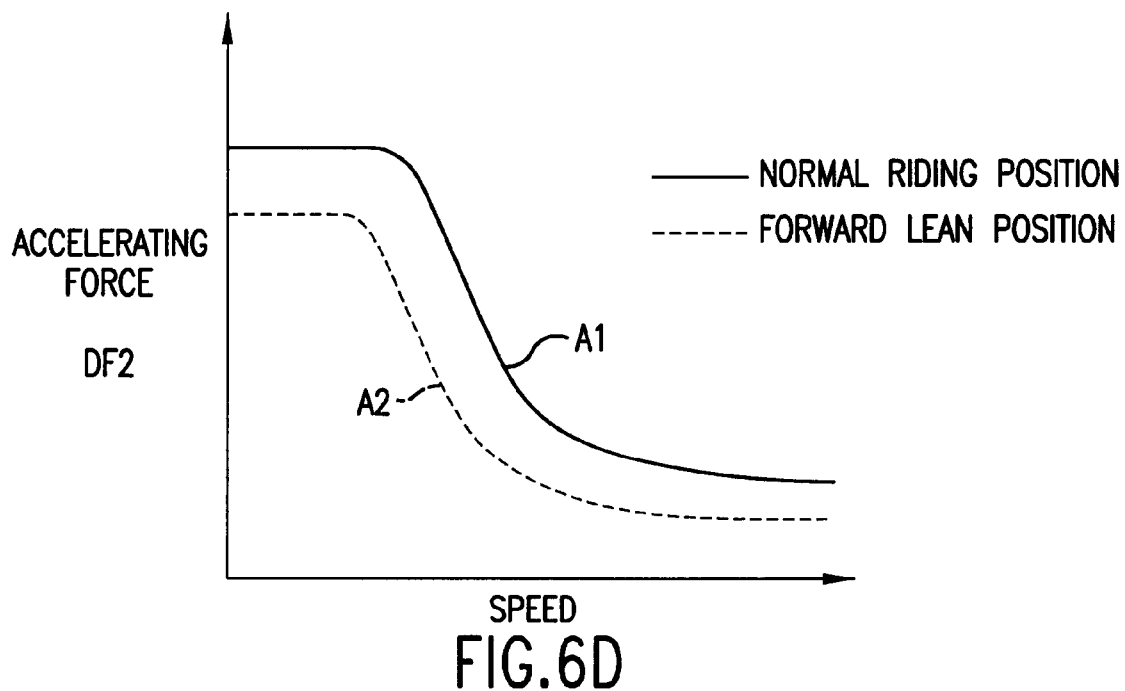

FIG. 6(D) shows a speed-accelerating force table which is stored in speed-accelerating force table memorizing unit 184 in FIG. 5. This table sets forth the accelerating force component DF1 as a function of speed, in which a solid line A1 represents a profile obtained in the normal riding position and a dotted line A2 represents a profile obtained in the forward lean position. As apparent from the profiles A1 and A2, the accelerating force component DF1 (DF1R) in this embodiment is larger in the normal riding position than in the forward lean position. The difference between force components DF1R and SFR becomes larger in the normal riding position, and the moving object is more likely to do a wheelie as apparent from FIG. 6(A). On the other hand, the difference between force components DF1R and SFR becomes smaller in the forward lean position, and the moving object is less likely to do a wheelie as apparent from FIG. 6(B). Therefore, a player can restrict the moving object from doing a wheelie by taking the forward lean position.

In the speed-accelerating force table in FIG. 6(D), only a single profile of, for example, A2 may be predetermined as a default value rather than providing two different profiles A1 and A2. With a single default value, it may be multiplied by a certain value that is larger than 1 to obtain the other profile A1.

Figure 7:
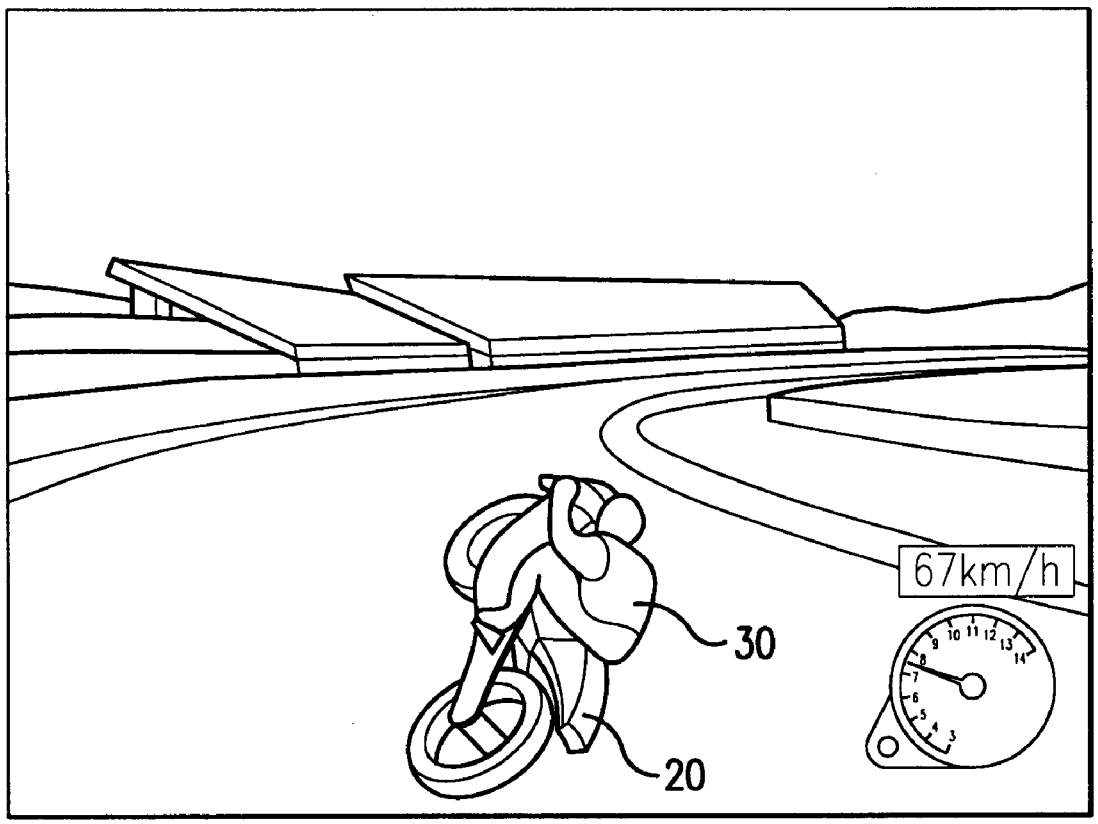
FIG. 7 is an example of a three-dimensional image produced according to an embodiment of the invention, illustrating the front wheel "wheelie" of a moving object.

FIG. 7 is an example of a three-dimensional image produced according to an embodiment of the invention, illustrating the front wheel wheelie of moving object 20. The invention provides a wheelie of moving object 20 as represented and animated in FIG. 7. In addition, the player has an option of controlling the degree of the wheelie (the magnitude of a pitch angle) of moving object 20 on a screen by means of changing his or her position between the normal riding position and the front lean position. Therefore, the invention significantly encourages a sense of presence in the virtual world with high reality. As apparent from FIG. 7, the motion of a rider 30 on moving object 20 is also subjected to processing to achieve the wheelie.

According to this embodiment of the invention, the speed of the moving object is also controlled. For example, as shown in FIGS. 8(A) and 8(B), moving object 20 moves faster when the player is in the forward lean position than in the normal lean position. This gives the player control of the speed of moving object 20 merely by leaning his or her body to the forward lean position. The system gives the player(s) a real sense of speed and danger, and the player can enjoy various driving techniques that have not been achieved with conventional game systems. In particular, this embodiment provides the player a choice of substantially increasing (changing) the maximum speed limit even when the maximum speed of moving object 20 is limited.

It is preferable that the speed control of moving object 20 be made in accordance with the air resistance coefficient (air resistance coefficient information in a broad sense). More specifically, as shown in FIG. 8(C), the air resistance coefficient of moving object 20 is increased (or a default air resistance coefficient $\alpha_1$ is set) when the player is in the normal riding position to decrease the speed of moving object 20. On the other hand, as shown in FIG. 8(D), the air resistance coefficient of moving object 20 is decreased (or a smaller air resistance coefficient $\alpha_2$ is set) when the player is in the forward lean position to increase the speed of moving object 20. For example, a force component $FM_k$ acting on the moving object in a k-th frame can be given by the following equation (3). Then, the force component $FM_k$ divided by the mass of the moving object is an acceleration $AM_k$ of the moving object in the k-th frame.

$$FM_k = DF_k - C_1 \times \alpha \times VM_k^2 - RF_k \qquad (3)$$

wherein $DF_k$ is an accelerating force component (driving force), $C_1$ is a constant, $\alpha$ is an air resistance coefficient of the moving object, $VM_k$ is a velocity of the moving object and $-RF_k$ is a resistance acting on the moving object other than the air resistance (e.g., a rolling frictional resistance of a wheel). The system of this embodiment decreases the air resistance coefficient a (or information indicative of a rate of $\alpha$) of the air resistance ($-C_1 \times \alpha \times VM_K^2$) in the above equation (3) to increase the force component $FM_k$ acting on the moving object and the acceleration $AM_k$ of the moving object, thereby increasing the speed of the moving object.

Figure 9A:
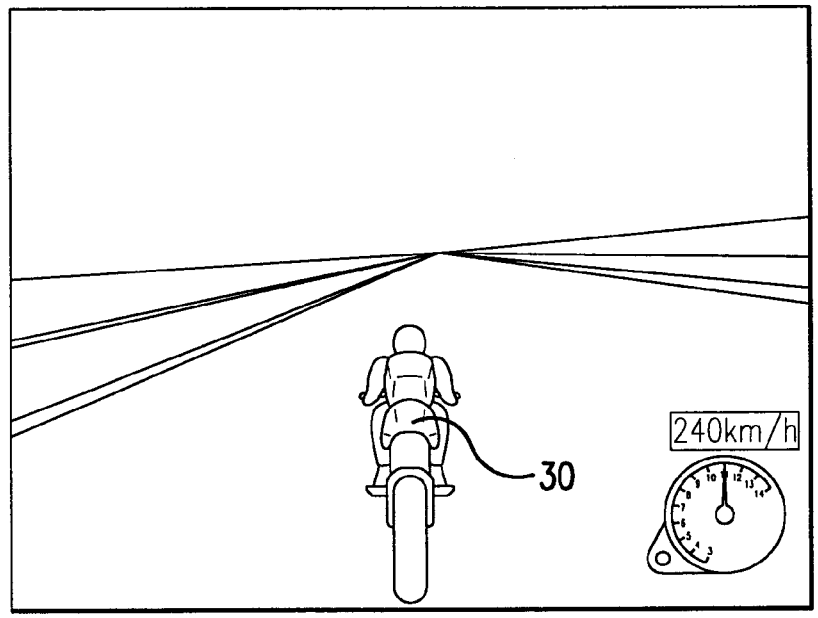
FIGS. 9(A) and 9(B) are examples of a three-dimensional image produced according to an embodiment of the invention, illustrating a normal riding mode and a forward lean riding mode.
Figure 9B:
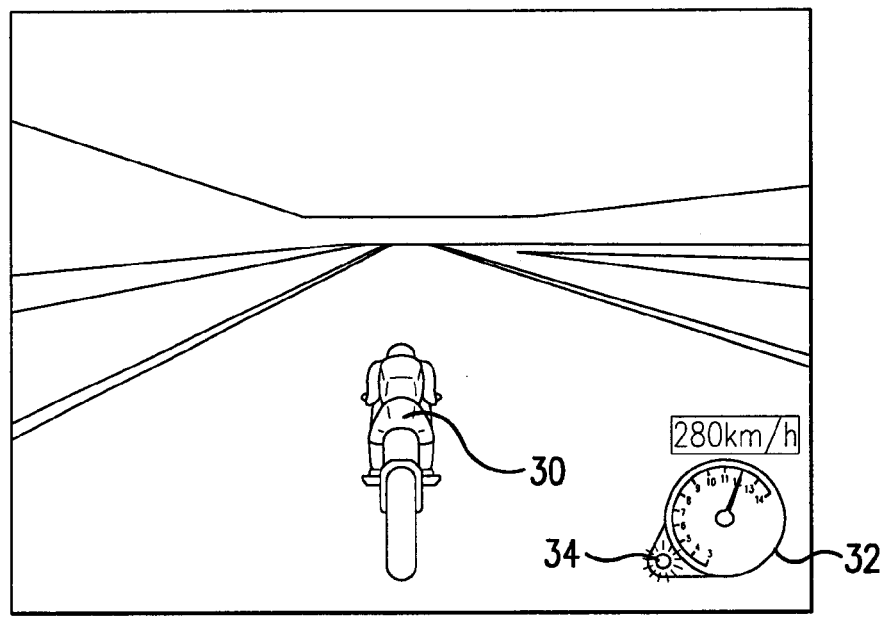

One scheme used to increase the speed of the moving object involves the simple addition of a certain value to the acceleration or the velocity of the moving object. However, such a scheme may sometimes increase the speed of the moving object without restriction or unnaturally. On the contrary, the scheme based on increasing the air resistance coefficient a results in convergence of the speed of the moving object to a certain value because the velocity $VM_k$ increases when the coefficient $\alpha$ decreases. Therefore, unnatural or unlimited increase of the speed of the moving object can be avoided effectively. It is noted that the speed of the moving object may be increased in another way, for example, to give preference to simplicity of the operation by means of merely adding a certain value to the acceleration or the velocity of the moving object. Furthermore, the motion of a person or cartoon character (a moving object in a broad sense) is controlled according to the forward lean position information. In particular, the normal riding position of the player (see FIG. 1) results in the motion of rider 30 on the screen in the normal riding position as shown in FIG. 9(A). To this end, the motion data for the normal riding position is read out of motion memorizing unit 182 in FIG. 5. The forward lean position of the player (see FIG. 2) results in the motion of rider 30 on the screen in the forward lean position as shown in FIG. 9(B). To this end, the motion data for the forward lean position is read out of motion memorizing unit 182 in FIG. 5. The motion of the player is associated with the motion of rider 30 on the screen and, thus, the player can enter a better world of virtual reality.

In this embodiment, detection of the player's forward lean position flickers a lamp 34 (a forward lean position sense and transmission unit in a broad sense) of a tachometer 32. Lamp 34 indicates to the player that the forward lean position is detected, so the player can find the threshold of the position change by observing lamp 34. In other words, the player can recognize the degree of lean to be in the forward lean position. Therefore, it is possible to provide useful information to a player who wants to jockey for position by means of leaning forward. In this embodiment, the motion of rider 30 may be changed gradually by detecting the degree of lean stepwise. Rider 30 leans to a lesser extent when the player leans forward to a lesser extent and rider 30 leans to a larger extent when the player leans forward to a larger extent. Such synchronous motions of the player and rider 30 on the screen encourage the player to have a sense of presence in the world of riding. The stepwise change of the degree of lean of rider 30 may be achieved by using motion interpolation or inverse kinematics to animate the motion of the moving object.

Figure 10A:
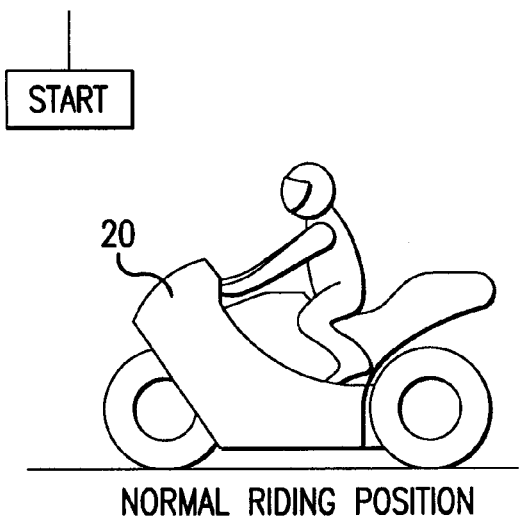
FIGS. 10(A) through 10(D) are representations describing a technique to control an accelerating force of a moving object at the beginning of driving.
Figure 10B:
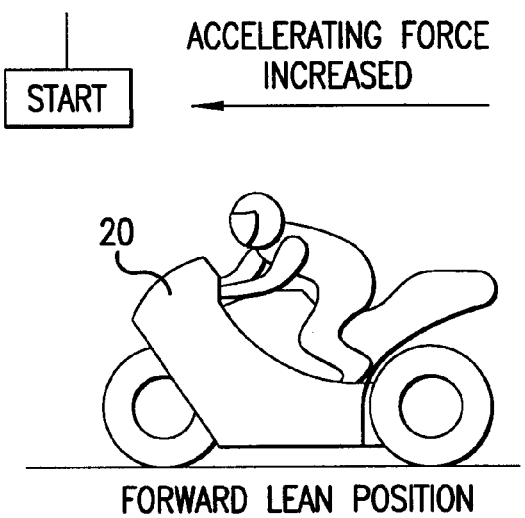

Furthermore, the system of this embodiment controls the accelerating force (driving force, acceleration performance) of the moving object according to the forward lean position information obtained at the start of the driving, i.e., when the moving object begins to run. For example, as shown in FIGS. 10(A) and 10(B), a larger accelerating force of moving object 20 is used when the player starts driving in the forward lean position rather than the normal riding position. That is, it is assumed that the weight distribution to the front and rear wheels of moving object 20 is better when the player is in the forward lean position at the beginning of running of moving object 20. It is also assumed that the accelerating force of moving object 20 is transmitted to the ground surface more effectively to provide a fast start of moving object 20 when the player is in the forward lean position.

The player can thus have a choice of fast start of moving object 20 that he or she can control and, as a result, enjoys various driving techniques providing increased entertainment in the world of virtual reality racing, which has not yet been achieved in conventional game systems.

Figure 10C:
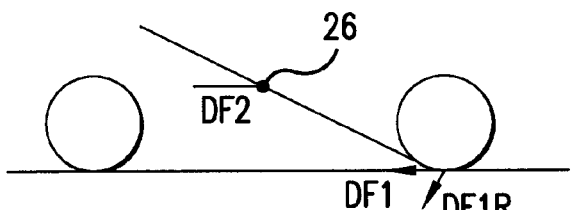

In this embodiment, the force component contributing to the rotation of the moving object is separated from the force component contributing to the translation motion of the moving object. As shown in FIG. 10(C), the force component DF1 (DF1R) contributing to the rotation of the moving object is different from the force component DF2 contributing to the translation motion (parallel movement) of the moving object. This allows independent and separate control of the rotation and translation motions of the moving object. Force component DF1 is decreased when the player is in the forward lean position, while force component DF2 is decreased when the player is in the normal riding position and is increased when the player is in the forward lean position, as can be seen from profiles A1 and A2 in FIG. 6(D) and B1 and B2 in FIG. 10(D).

Figure 10D:
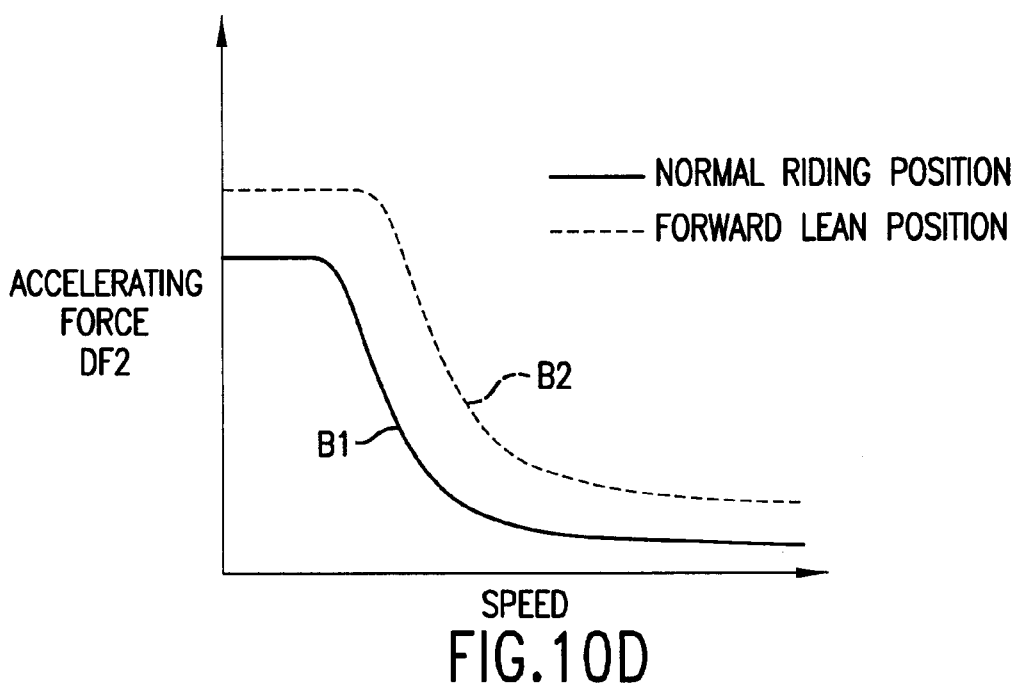

For example, force component DF1 should be identical to force component DF2 when adhered to real simulation but force components DF1 and DF2 have different properties as illustrated by A1, A2, B1 and B2 in FIGS. 6(D) and 10(D). That is, the invention provides simulation in a manner different from real life, and force component DF1 is separated from force component DF2. Accordingly, the rotation force (drive torque to cause a wheelie) acting on moving object 20 can be increased when the player is in the normal riding position at the start of movement as shown in FIG. 6(A) while decreasing the accelerating force of moving object 20 as shown in FIG. 10(A). In other words, the invention allows the player to start the motorcycle rather slowly while enjoying a showy wheelie. On the other hand, the rotation force acting on moving object 20 can be decreased when the player is in the forward lean position at the start of movement as shown in FIG. 6(B) while increasing the accelerating force of moving object 20 as shown in FIG. 10(B). That is, the player can also start fast while restricting the wheelie.

Operation sequences according to this embodiment of the invention are described in detail with reference to the flow chart in FIG. 11. The operation information including the forward lean position information is obtained from control device 10 in FIG. 5 (step S1). The forward lean position information used herein is not limited to information indicative of whether or not the player is in the forward lean position. The forward lean position information may indicate the degree of forward lean of the player. Next, it is determined, according to the forward lean position information obtained, whether the player is in the forward lean position (step S2). If the player is in the forward lean position, then a small rotation force (default rotation force) is selected (step S3). In other words, the profile as depicted by line A2 in FIG. 6(D) is selected to restrict moving object 20 from doing a wheelie as described in conjunction with FIG. 6(B). In addition, if the player is determined to be in the forward lean position, a small air resistance coefficient is selected (step S4) to increase the speed of moving object 20 as described in conjunction with FIGS. 8(B) and 8(D). Furthermore, motion data for the forward lean position are selected (step S5) to create a scenery graphic of the game as shown in FIG. 9(B).

On the contrary, if it is determined in step S2 that the player is not in the forward lean position (that is, the player is in the normal riding position), then a large rotation force is selected (step S6). In other words, the profile as depicted by line A1 in FIG. 6(D) is selected to make it easy to do a wheelie with moving object 20 as described in conjunction with FIG. 6(A). In addition, if the player is determined to be in the normal riding position, a large air resistance coefficient (default air resistance coefficient) is selected (step S7) so as to not increase the speed of moving object 20 as described in conjunction with FIGS. 8(A) and 8(C). Furthermore, a motion data for the normal riding position is selected (step S8) to create a scenery graphic of the game as shown in FIG. 9(A).

Subsequently, it is determined whether the driving has just begun (step S9). If the result of step S9 is affirmative, indicating that the driving has just begun, then it is determined whether the player is in the forward lean position (step S10). If the player is in the forward lean position, then a large accelerating force is selected (step S11). In other words, the profile as depicted by B2 in FIG. 10(D) is selected to increase the accelerating force of the moving object as described in conjunction with FIG. 10(B). On the other hand, if step S9 is negative, indicating that it is not the start of driving, or when step S10 is negative indicating that the player is not in the forward lean position, then a small accelerating force (default accelerating force) is selected (step S12). In other words, the profile as depicted by B1 in FIG. 10(D) is selected not to increase the accelerating force of the moving object as described in conjunction with FIG. 10(A).

Next, the position and orientation of the moving object in the current frame are calculated (step S13). This calculation is performed based on the rotation force obtained in step S3 or S6, the air resistance coefficient obtained in step S4 or S7 and the accelerating force obtained in step S11 or S12. Finally, the scenery graphic corresponding to the situation of that frame is created in step S14.

Figure 12:
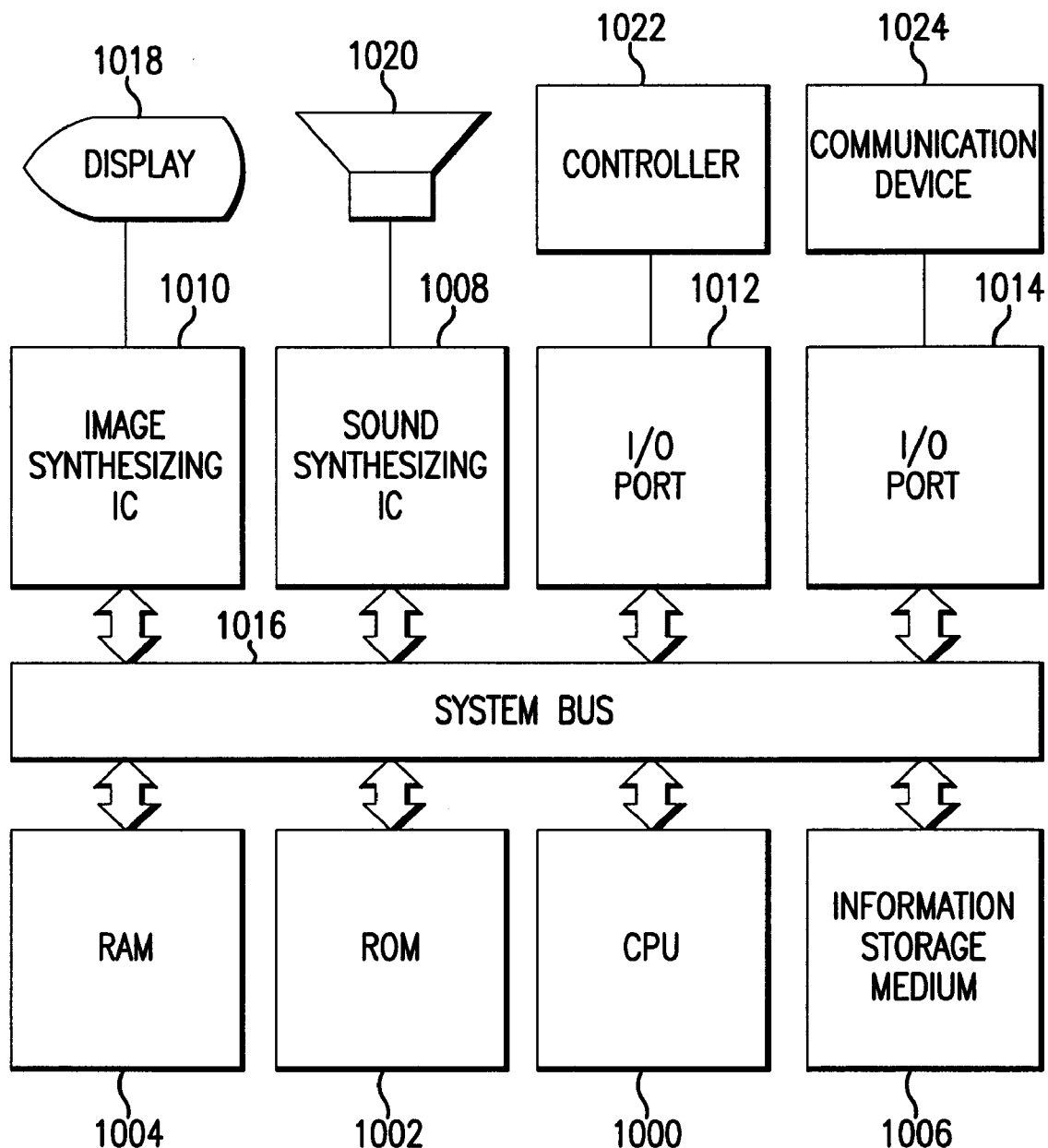
FIG. 12 depicts a hardware configuration for implementing an embodiment of the invention.

Next, an exemplified hardware configuration in which an embodiment of the invention can be implemented is described with reference to FIG. 12. The system illustrated in FIG. 12 includes a central processing unit (CPU) 1000, a read-only memory (ROM) 1002, a random access memory (RAM) 1004, an information storage medium 1006, a sound synthesizing IC 1008, an image synthesizing IC 1010 and input and output (I/O) ports 1012 and 1014, which are connected with each other through a system bus 1016 such that data can be transmitted and received in both directions. Image synthesizing IC 1010 is connected to a display 1018 while sound synthesizing IC 1008 is connected to a speaker 1020. I/O port 1012 is connected to a controller 1022 while I/O port 1014 is connected to a communication device 1024.

Information storage medium 1006 mainly stores programs, image data for creating the scenery graphics and sound data. For example, the information storage medium may be a CD-ROM, a game cartridge, a DVD in a personal game device, or a memory such as a ROM in an arcade game. In the latter event, information storage medium 1006 may be achieved by the same memory as ROM 1002. Controller 1022 corresponds to a game controller or an operation panel for allowing the player to enter his or her choice of game system.

CPU 1000 controls the entire system and performs processing of data based on and in accordance with the program (s) stored in information storage medium 1006, a system program (such as initialization information for the system itself) stored in ROM 1002 and a signal supplied by the player through controller 1022. RAM 1004 is a memory used as a work area for CPU 1000. RAM 1004 stores a part or the whole content of information storage medium 1006 or ROM 1002 or a calculation result obtained by CPU 1000. A logical data structure for embodying the invention is established on the RAM or the information storage medium.

Further, the game system of the type described includes sound synthesizing IC 1008 and image synthesizing IC 1010 to provide suitable and proper sound and visual effects. Sound synthesizing IC 1008 is an integrated circuit that synthesizes a game sound including surround music, background music and sound effects according to the information stored in information storage medium 1006 and/or ROM 1002. The synthesized sounds are produced through speaker 1020. Image synthesizing IC 1010 is an integrated circuit to synthesize pixel information to be supplied to display 1018 according to the image information supplied from RAM 1004, ROM 1002 and information storage medium 1006. Display 1018 may be a head mounted display (HMD).

Communication device 1024 is for communicating the information used in the game system with the periphery of the system. Alternatively, communication device 1024 may be used for transmitting and/or receiving information with another game system connected to the local system based on the game program. Communication device 1024 may also be used when the information such as a program is exchanged between two or more game systems through a communication line.

Figure 11:
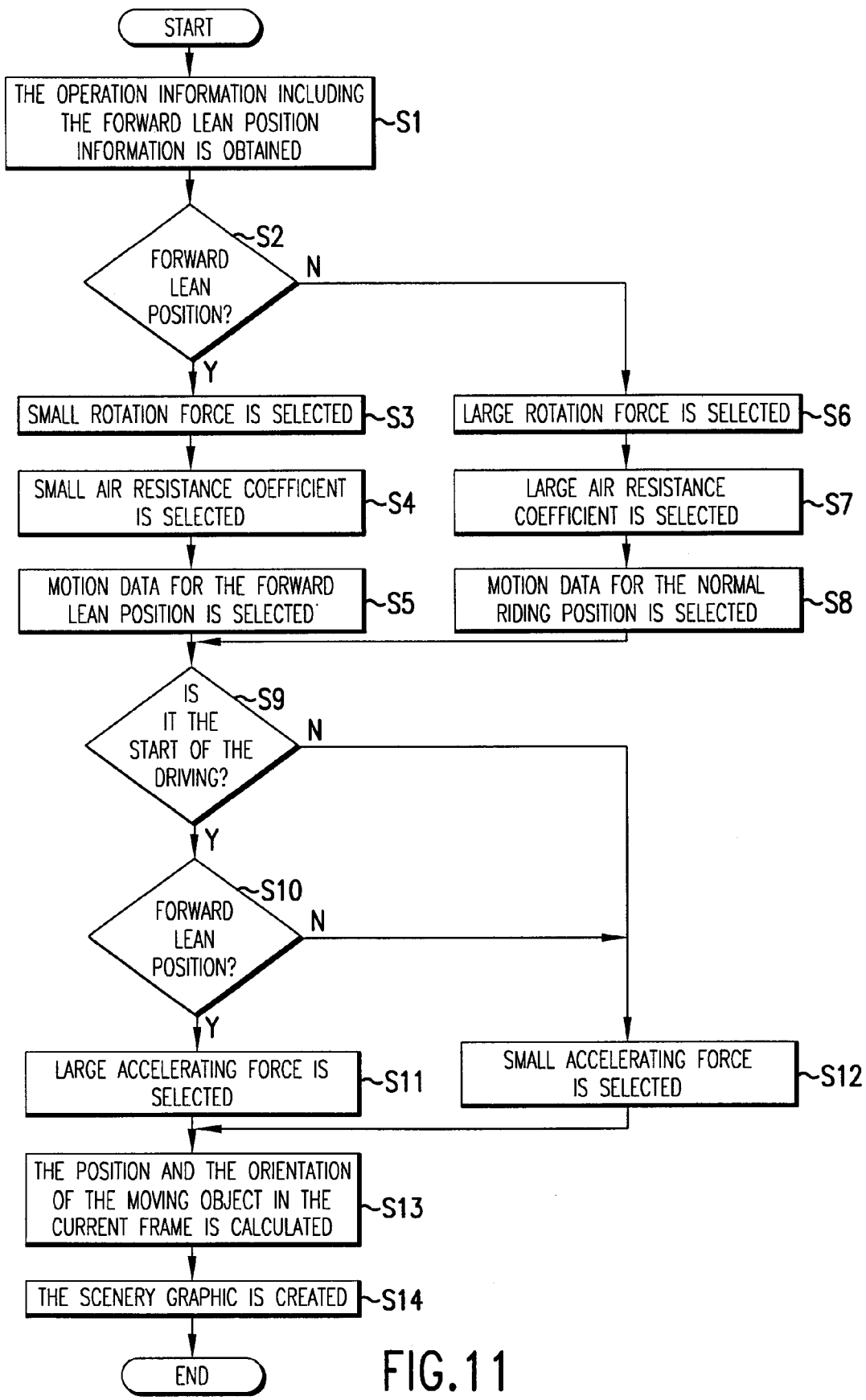
FIG. 11 depicts a flow chart illustrating detailed operation sequences according to an embodiment of the invention.

The operational sequences described in conjunction with FIGS. 1 through 10(D) are realized by information storage medium 1006 storing the program for carrying out the operation depicted by the flow chart in FIG. 11, CPU 1000 to be operated according to that program and image and sound synthesizing ICs 1010 and 1008. Image synthesizing IC 1010 and sound synthesizing IC 1008 may be achieved by a software program by using CPU 1000 or a general-purpose digital signal processor (DSP).

When the invention is applied to the arcade game as described in conjunction with FIG. 1, a system board (circuit board) 1106 contained in the system includes the CPU, image synthesizing IC and sound synthesizing IC, all of which are mounted thereon. A semiconductor memory 1108 which serves as the information storage medium on system board 1106 contains the information for carrying out the game computing based on the operation information supplied by the player which includes the forward lean position information detected by the unit for detecting the forward lean position of the player, information for carrying out the processing to create at least one of the game image (scenery graphics) and sound according to the game computing, information for controlling the moving object in the object space in response to the operation by the player and information for carrying out the game computing based on the operation information supplied by the player which includes the distance information detected by the unit to detect the distance or the gap between the detector and the player. These pieces of information are hereinafter collectively referred to as stored information. The stored information includes at least one of program codes, image information, sound information, information indicative of a shape and/or configuration of an object to be displayed, table data, list data, player information, information to instruct processing according to the invention and information for use in carrying out the processing according to the instruction.

Figure 13A:
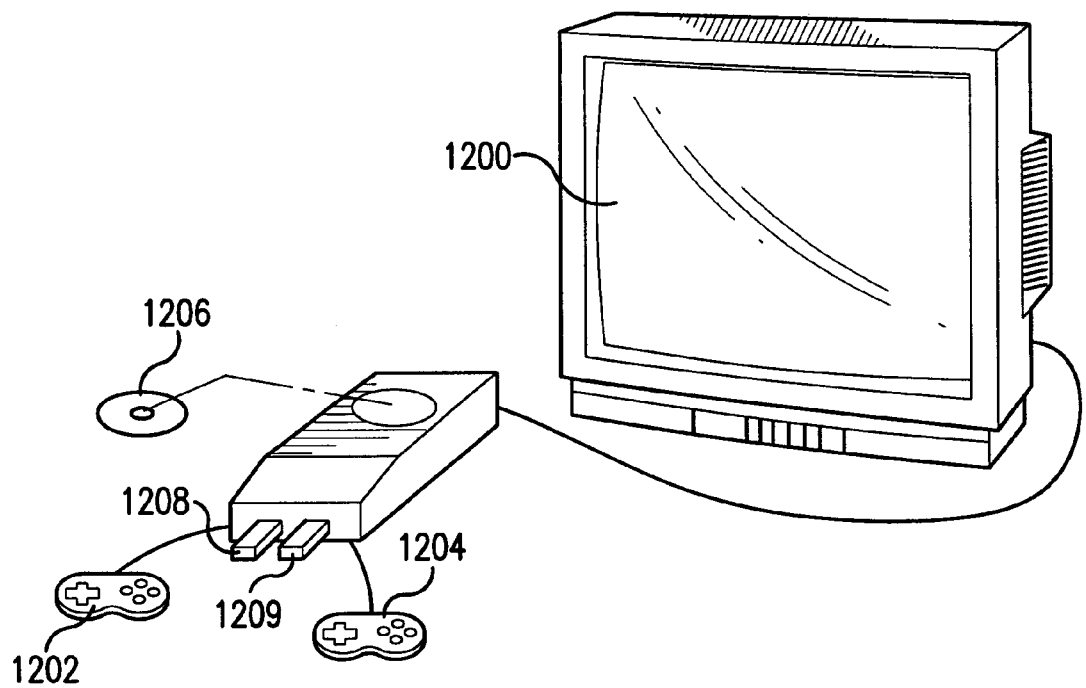
FIGS. 13(A) and 13(B) show certain applications of an embodiment of the invention.

FIG. 13(A) shows an embodiment of the invention applied to a personal game system. The player can enjoy game play by using game controllers 1202 and 1204 while viewing scenery graphics displayed on a display 1200. In such a case, the above-mentioned stored information is stored in a CD-ROM 1206 or memory cards 1208 or 1209 which are information storage media which can be freely connected to or disconnected from a body member. When the embodiment of the invention is applied to the personal game system as shown in FIG. 13(A), the forward lean position detector/distance sensor may be provided on game controllers 1202 and 1204, on memory cards 1208 and 1209, or the body member.

Figure 13B:
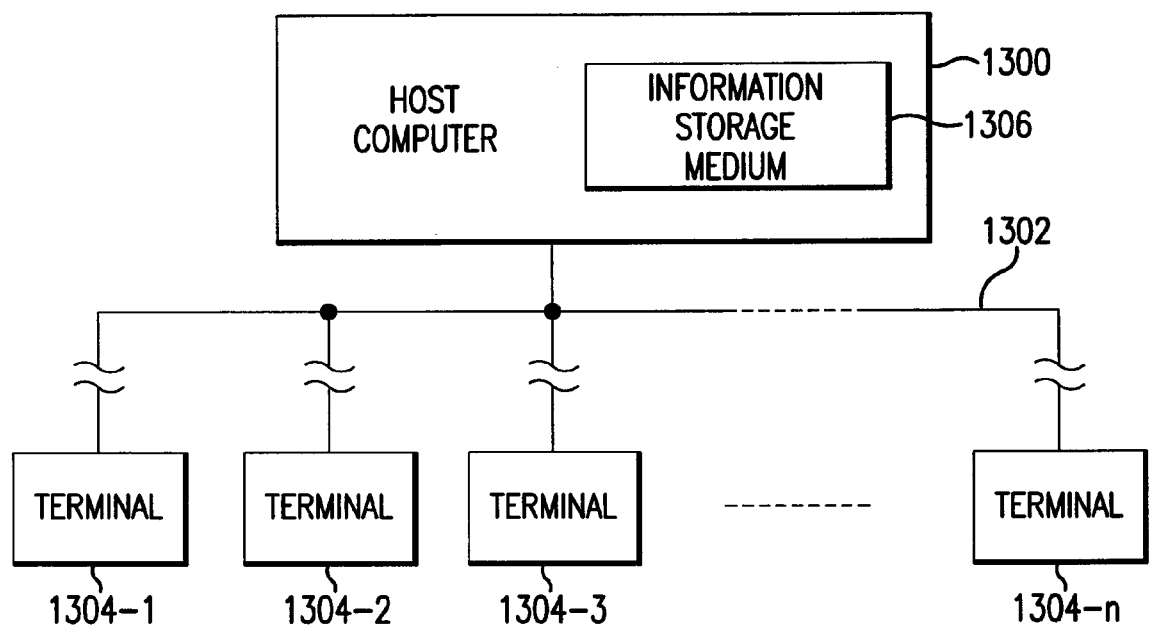

FIG. 13(B) shows another application of the embodiment of the invention in which a system comprises a host computer 1300 and terminals 1304-1 through 1304-n connected to host computer 1300 through a communication line (a small-scale network such as a local area network, or a wide area network such as the Internet) 1302. In such a case, the above-mentioned stored information may be stored in an information storage medium 1306 which host computer 1300 can control. Examples of information storage medium 1306 includes, but not limited to, a magnetic disk device, a magnetic tape device, or a semiconductor memory. When terminals 1304-1 through 1304-n each comprises a CPU, an image synthesizing IC and a sound synthesizing IC and serves as a stand alone game system capable of creating the scenery graphics and the sounds, then host computer 1300 may distribute a game program to terminals 1304-1 through 1304-n to create the scenery graphics and sounds. On the other hand, if the terminals have no function so as to constitute a stand alone game system, then host computer 1300 would have to create the scenery graphics and sounds and supply them to terminals 1304-1 through 1304-n where they are displayed and emitted.

In addition, the configuration as illustrated in FIG. 13(B) may be achieved with a distributed processing architecture. More specifically, the necessary processing and operations may be assigned to the host computer and the terminals (or to a host computer and a server computer, if any). The above-mentioned stored information may be separated and stored in either the information storage medium on the host computer or in the information storage medium on the terminal.

The terminal(s) connected to the communication line may be a personal game system or an arcade game system. When an arcade game system is connected to the communication line, it is preferable that a personal information storage medium (memory card, PDA, personal game system) be used that is capable of accessing both the arcade and personal game systems to transmit and receive information with the game systems.

It will be apparent that the foregoing disclosure and description of the invention are illustrative and explanatory thereof and various modifications and changes may be made without departing from the spirit and scope of the invention. For example, the discussion above has focused on a game system in which the forward lean position of the player is to be detected to determine a distance between the player and the detector. However, the objective to be detected by the distance detecting unit is not limited to the forward lean position, though the forward lean position is preferable. In addition, the game computing may be carried out depending on a stepwise change of the forward lean of the player and/or a distance detected stepwise. Furthermore, the invention is not limited to the control of the moving object made according to the forward lean position information and the distance information. The forward lean position information and/or distance information may be used in game computing operations other than the one to control the moving object. The control of the moving object according to the forward lean position information and/or the distance information is also not limited to the one described in the above embodiment. Driving performances (e.g., brake performance, acceleration performance, cornering performance, etc.) of the moving object may be controlled by using these pieces of information. Moreover, the position and the orientation of the moving object may be determined by the procedures other than those represented by the equations (1), (2) and (3). Various modifications and changes can be made to the procedure to determine the position and/or the orientation of the moving object.

Furthermore, the application and usage of the invention is not limited to the one described in the preferred embodiment. Instead, the invention may be applied to various games such as bicycle-, motorbike- and automobile-racing games, athletic games, skiing games, snow boarding games, tennis games, soccer games, baseball games, action games, roller-blading games, combat games, music playing games, dancing games or any type of arcade game requiring a player's input. In addition, the invention may also be applied to various game systems including personal and arcade game systems, simulator systems, large-scaled attraction systems for many players, personal computers, multi-media terminals and system boards that create game images (graphic scenery).

What is claimed is:

1. A game system, comprising:
    a mounting member which a player mounts and maneuvers to perform a game operation;
    a detector detecting a forward lean position of the player based at least on the player's maneuvering of the mounting member;
    a processor carrying out game computation according to operation information supplied by the player, the operation information including information indicative of the forward lean position of the player; and
    means for carrying out game processing to create at least one of a game image and a game sound according to a computation result.

2. A game system as claimed in claim 1, further comprising a controller which controls a moving object traveling in an object space according to the forward lean position information in response to the operation information supplied by the player.

3. A game system as claimed in claim 2, wherein at least one of a force to rotate the moving object, a speed of the moving object and a motion of the moving object is controlled by said controller according to the forward lean position information.

4. A game system as claimed in claim 3, wherein the speed of the moving object is controlled by changing information indicative of an air resistance coefficient of the moving object according to the forward lean position information.

5. A game system as claimed in claim 2, wherein a force to accelerate a moving object is controlled according to a force in the forward lean position information obtained at the beginning of movement of a moving object.

6. A game system as claimed in claim 5, wherein a force component contributing to a rotation of a moving object is separated from a force component contributing to a translation motion of the same moving object.

7. A game system as claimed in claim 1, wherein the detector detecting the forward lean position of the player senses a distance between the player and the detector which is disposed in front of the player.

8. A game system, comprising:
    a mounting member which a player mounts and maneuvers to perform a game operation;
    a detector detecting a distance from the player based at least on the player's maneuvering of the mounting member;
    a processor carrying out game computation according to operation information supplied by the player, the operation information including information indicative of the distance from the player; and
    means for carrying out game processing to create at least one of a game image and a game sound according to a computation result.

9. A storage medium storing information readable by a computer, the storage medium, comprising:
    information for use in game computation according to operation information supplied by a player mounting on a mounting member and maneuvering the mounting member, the operation information including information indicative of a forward lean position of the player detected by a detector detecting the forward lean position of the player based at least on the player's maneuvering of the mounting member; and information for use in carrying out game processing to create at least one of a game image and a game sound according to a computation result.

10. A storage medium storing information readable by a computer, the storage medium, comprising:

information for use in game computation according to operation information supplied by a player mounting on a mounting member and maneuvering the mounting member, the operation information including information indicative of a distance from the player detected by a detector detecting the distance from the player based at least on the player's maneuvering of the mounting member; and information for use in carrying out game processing to create at least one of a game image and a game sound according to a computation result.

11. A game system, comprising:

a control device operated by a player;

a mounting member which the player mounts and maneuvers to perform a game operation;

a detector adapted to detect a forward lean position of the player to produce data indicative of the forward lean position of the player as position data based at least on the player's maneuvering of the mounting member; and a processor connected to said control device and said detector, said processor being configured to carry out game computation to provide at least one of game scenery graphics and sounds in response to data supplied by the player through said control device and the position data supplied from said detector.

12. A game system as claimed in claim 11, wherein said detector is disposed away from said mounting member.

13. A game system as claimed in claim 12, wherein said detector comprises a light transmitter and a light receiver, said transmitter being disposed on one side of the mounting member, said receiver being disposed the other side of the mounting member.

14. A game system as claimed in claim 11, wherein said detector is disposed on said mounting member at a position in front of the player.

15. A game system as claimed in claim 11, further comprising:

a display disposed in a field of view of the player to display the game scenery graphics thereon, the game scenery graphics including an object space having a moving object therein and a motion of the moving object being associated with a motion of the player.

16. A game system as claimed in claim 15, wherein the moving object is controlled according to the position data.

17. A game system as claimed in claim 15, wherein a force to rotate the moving object is controlled according to the position data.

18. A game system as claimed in claim 15, wherein a speed of the moving object is controlled according to the position data.

19. A game system as claimed in claim 18, wherein the speed of the moving object is controlled by changing an air resistance coefficient for the moving object.

20. A game system as claimed in claim 15, wherein the motion of the moving object is controlled according to the position data.

21. A game system as claimed in claim 15, wherein an accelerating force on the moving object is controlled according to the position data that is obtained at the beginning of a movement of the moving object.

22. A game system as claimed in claim 15, wherein a force acting on the moving object is divided into a force component contributing to a rotation of the moving object and a force component contributing to a translation motion thereof.

23. A game system as claimed in claim 11, wherein said processor comprises:

rotation force controlling means for controlling a force to rotate a moving object;

speed controlling means for controlling a speed of the moving object;

motion controlling means for controlling a motion of the moving object; and accelerating force controlling means for controlling an accelerating force on the moving object.

24. A game system, comprising:

a control device operated by a player;

a mounting member which the player mounts and maneuvers to perform a game operation;

a detector adapted to detect a forward lean position of the player to produce data indicative of the forward lean position of the player as a position data based at least on the player's maneuvering of the mounting member;

a processor connected to said control device and said detector, said processor being configured to carry out game computation to provide at least one of game scenery graphics and sounds in response to data supplied by the player through said control device and the data supplied from said detector; and a display disposed in a field of view of the player to display the game scenery graphics thereon, the game scenery graphics including an object space having a moving object therein and a motion of the moving object being associated with a motion of the player, and wherein said processor comprises:

rotation force controlling means for controlling a force to rotate the moving object;

speed controlling means for controlling a speed of the moving object;

motion controlling means for controlling a motion of the moving object; and accelerating force controlling means for controlling an accelerating force on the moving object.

25. A game system as claimed in claim 24, wherein the force to rotate the moving object is controlled according to the position data.

26. A game system as claimed in claim 24, wherein the speed of the moving object is controlled according to the position data.

27. A game system as claimed in claim 24, wherein the motion of the moving object is controlled according to the position data.

28. A game system as claimed in claim 27, wherein the speed of the moving object is controlled according to the position data.

29. A game system as claimed in claim 27, wherein the accelerating force on the moving object is controlled according to the position data.

30. A game system as claimed in claim 24, wherein the accelerating force on the moving object is controlled according to the position data.

* * * * *